Nov. 7, 1933.      J. B. STRAUSS      1,934,385
VEHICLE
Original Filed June 18, 1928
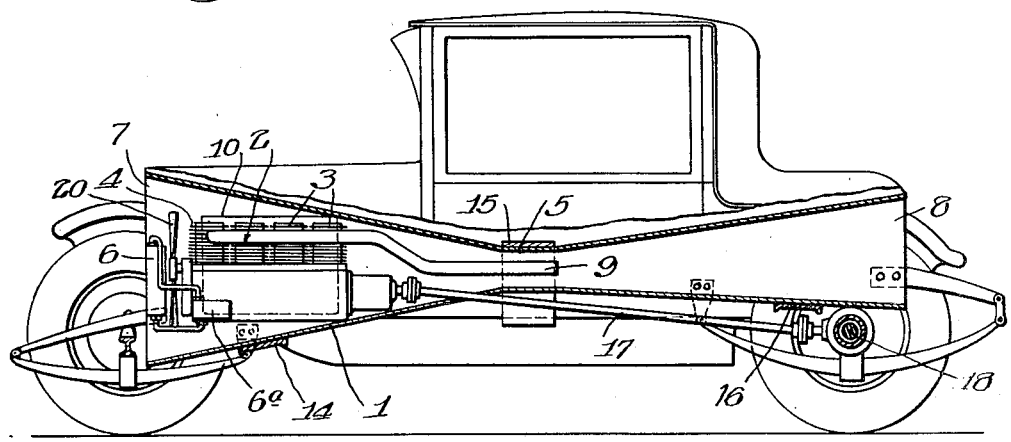
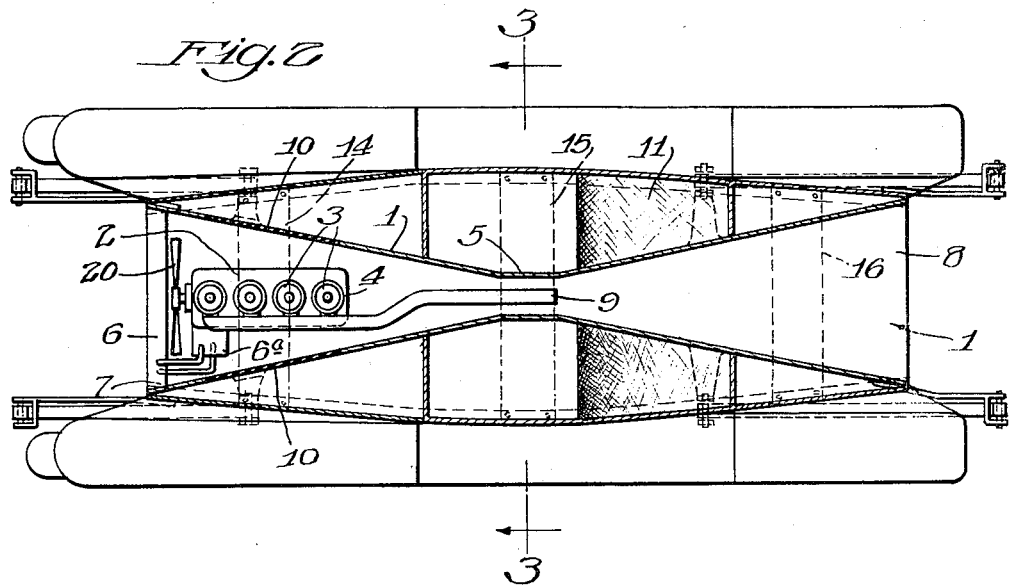
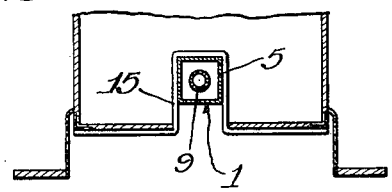

Patented Nov. 7, 1933

1,934,385

UNITED STATES PATENT OFFICE 1,934,385

VEHICLE

Joseph B. Strauss, Chicago, Ill.

Application June 18, 1928, Serial No. 286,075
Renewed August 7, 1933

2 Claims. (Cl. 180—1)

This invention relates to moving vehicles and has for its object to provide a new and improved device of this description.

The invention has as a further object to provide a vehicle with a centrally disposed, hollow, metallic member extending from the front to the rear.

The invention has as a further object to provide a vehicle with a hollow, metallic member extending from the front to the rear and forming the chassis and open at both ends, the motor for driving the vehicle being located therein. This application sets out an improvement on my prior application number 207,095, filed July 20, 1927, now Patent No. 1,816,161 dated July 28, 1931.

The invention has other objects which are more particularly pointed out in the accompanying description.

Referring now to the drawing, Fig. 1 is a view with parts broken away showing one form of device embodying the invention.

Fig. 2 is a horizontal, sectional view through the device illustrated in Fig. 1.

Fig. 3 is a sectional view taken on line 3—3 of Fig. 2.

Like numerals refer to like parts throughout the several figures.

Referring now to the drawing, I have, for purposes of illustration, shown my invention in connection with an automobile. In carrying out my invention I provide a centrally located, hollow, metallic member 1 which extends from the front to the rear of the vehicle and which acts as the main frame therefor. This hollow, metallic member is open at both ends. The engine 2 is located in this hollow, metallic member. The cylinders 3 of the engine are preferably provided with fins 4. The hollow, metallic member 1 is preferably contracted between its ends, as shown at 5. I prefer to provide an oil radiator 6 also located within the hollow, metallic member and preferably at the front end 7 thereof. The oil is passed through the cooling radiator 6 by a pump 6a. The front end 7 is enlarged and flared and the rear end 8 is enlarged or flared. The exhaust pipe 9 of the engine preferably extends into the hollow, metallic member and is arranged to discharge the exhaust preferably beyond the contracted portion 5.

The hollow member 1 is preferably provided at each side opposite the engine with doors 10 so as to give free access to the engine. The vehicle is provided with seats 11 arranged on opposite sides of the hollow member 1. The hollow member 1 may be provided with cross supporting members 14, 15 and 16. The engine is connected by the drive shaft 17 with the rear axle 18 in the usual manner.

By means of this device the elaborate, heavy chassis bracing may be eliminated. The hollow member 1, since it surrounds the engine, permits leg room to be extended around the engine on each side thereof. This permits the shortening of the body and the wheel base. As the engine is encased in the tubing the noise is reduced and the heat of the engine is discharged in the rear. The automobile, therefore, will be of lighter weight and much cheaper to construct, the hollow member forming the back bone of the entire structure as it were. This construction also eliminates the squeaks which occur with the ordinary chassis and body.

A fan 20 may also be provided particularly for use when the automobile is standing still and the engine running idle. By means of this device, when the vehicle is runnning, a current of air is rapidly passed through the hollow member at all times and the engine is air cooled thus eliminating the heavy water jacket systems used with the ordinary automobile. It is not necessary to have the fan running when the automobile is running. The fan, however, may be brought into action when the automobile is standing still. The springs are connected to the axle and are also connected with the member 1, the front springs having one end connected to the member 14. The member 15 is preferably bent as shown in Fig. 3 and extends above the member 1. The fenders, running board and body are associated parts and are preferably rigidly connected with the member 1.

I claim:—

1. A vehicle comprising a hollow, metallic member extending from the front to the rear of the vehicle and acting as a frame member therefor, the rear end thereof being open and free from obstructing parts and a body having portions thereof disposed on opposite sides of said hollow member and supporting members connecting a portion of said body with said metallic member, one of said supporting members being looped over the hollow metallic member.

2. A vehicle comprising a hollow, metallic frame member extending from the front to the rear of the vehicle and converging from the ends toward the middle so as to provide seat spaces near the middle of the vehicle on each side of the frame member, a body mounted on said hollow frame member and wheels connected with said hollow frame member, a support connected with said body and looped over the hollow metallic frame member near the middle thereof.

JOSEPH B. STRAUSS.